US006919447B2

(12) United States Patent
Komen et al.

(10) Patent No.: US 6,919,447 B2
(45) Date of Patent: Jul. 19, 2005

(54) HYPOCHLORITE FREE METHOD FOR PREPARATION OF STABLE CARBOXYLATED CARBOHYDRATE PRODUCTS

(75) Inventors: Joseph Lincoln Komen, Bothell, WA (US); S. Ananda Weerawarna, Seattle, WA (US); Richard A. Jewell, Bellevue, WA (US)

(73) Assignee: Weyerhaeuser Company, Federal Way, WA (US)

( * ) Notice: Subject to any disclaimer, the term of this patent is extended or adjusted under 35 U.S.C. 154(b) by 377 days.

(21) Appl. No.: 09/875,177

(22) Filed: Jun. 6, 2001

(65) Prior Publication Data

US 2003/0083491 A1 May 1, 2003

(51) Int. Cl.[7] .............................. C07H 1/00; C08B 3/00; C08B 31/00; C08B 33/08; C08B 35/08
(52) U.S. Cl. ........................ 536/124; 536/1.11; 536/56; 536/63; 536/102; 536/105; 536/110
(58) Field of Search ........................... 536/1.11, 56, 63, 536/102, 105, 110, 124

(56) References Cited

U.S. PATENT DOCUMENTS

| 3,575,177 | A |   | 4/1971 | Briskin et al. ................. 132/2 |
| 4,100,341 | A |   | 7/1978 | Brasey et al. ................. 536/56 |
| 4,401,810 | A | * | 8/1983 | Tang et al. .................... 536/56 |
| 4,480,089 | A | * | 10/1984 | Chen et al. .................... 536/56 |
| 4,505,775 | A |   | 3/1985 | Harding et al. ................ 162/9 |
| 4,679,278 | A |   | 7/1987 | Caumont |
| 4,889,654 | A | * | 12/1989 | Mason et al. ................ 510/370 |
| 5,667,637 | A |   | 9/1997 | Jewell et al. ................ 162/146 |
| 5,755,828 | A |   | 5/1998 | Westland ....................... 8/185 |
| 5,824,462 | A | * | 10/1998 | Ashida et al. ............... 430/531 |
| 6,031,101 | A |   | 2/2000 | Devine et al. .............. 546/112 |
| 6,117,833 | A |   | 9/2000 | Racherla |
| 6,127,573 | A |   | 10/2000 | Li et al. ...................... 546/419 |
| 6,228,126 | B1 |   | 5/2001 | Cimecioglu et al. |
| 6,242,245 | B1 |   | 6/2001 | Amann et al. |
| 6,379,494 | B1 | * | 4/2002 | Jewell et al. .................. 162/9 |
| 6,409,881 | B1 |   | 6/2002 | Jaschinski ..................... 162/9 |
| 6,447,644 | B1 |   | 9/2002 | Seltzer et al. |
| 6,514,384 | B1 | * | 2/2003 | Jewell et al. ............. 162/181.1 |
| 6,524,348 | B1 | * | 2/2003 | Jewell et al. ................ 8/116.1 |
| 2002/0072600 | A1 |   | 6/2002 | Bragd et al. |

FOREIGN PATENT DOCUMENTS

| EP | 0 574 666 A1 | 4/1993 | ......... C07D/211/94 |
| EP | 1 077 221 A1 | 2/2001 | ........... C08B/31/18 |
| EP | 1 077 285 A1 | 2/2001 | ........... D21H/11/20 |
| EP | 1 077 286 A1 | 2/2001 | ........... D21H/11/20 |
| FR | 2674528 | 10/1992 | ........... C08G/65/32 |
| JP | 2001/49591 | 2/2001 | ........... D21H/11/20 |
| WO | WO 95/07303 | 3/1995 | ........... C08B/37/00 |
| WO | WO 96/36621 | 11/1996 | ......... C07D/295/22 |
| WO | WO 96/38484 | 12/1996 | ........... C08B/31/18 |
| WO | WO 98/27117 | 6/1998 | |
| WO | WO 99/23117 | 5/1999 | ........... C08B/15/04 |
| WO | WO 99/57158 | 11/1999 | ........... C08B/31/18 |
| WO | WO 00/50388 | 8/2000 | ......... C07C/239/08 |
| WO | WO 00/50462 | 8/2000 | ........... C08B/15/02 |
| WO | WO 00/50463 | 8/2000 | ........... C08B/15/02 |
| WO | WO 00/50621 | 8/2000 | ........... C12P/12/00 |
| WO | WO 00/56978 | 9/2000 | |
| WO | WO 01/29309 | 4/2001 | |
| WO | WO 01/23657 | 5/2001 | |

OTHER PUBLICATIONS

U.S. Appl. No. 09/875,240.*
U.S. Appl. No. 10/390,354.*
U.S. Appl. No. 10/635,097.*
U.S. Appl. No. 10/635,109.*
U.S. Appl. No. 10/635,284.*
Andersson, R., J. Hoffman, N. Nahar, and E. Scholander. An n.m.r. study of the products of oxidation of cellulose and $(1 \to 4)$–$\beta$–D–xylan with sodium nitrite in orthophosphoric acid. *Carbohydrate Research* 206: 340–346 (1990).
Anelli, P.L., S. Banfi, F. Montanari, and S. Quichi. Oxidation of diols with alkali hypochlorites catalyzed by oxammonium salts under two–phase conditions. *Journal of Organic Chemistry* 54: 2970–2972 (1989).
Barzyk, D., D. H. Page, and A. Ragauskas. Acidic group topochemistry and fibre–to–fibre bond strength. *Journal of Pulp and Paper Science* 23(2): J59–J61 (1997).
Barzyk, D., D. H. Page, and A. Ragauskas. Carboxylic acid groups and fibre bonding. In *The Fundamentals of Papermaking Materials: Transactions of 11th Fundamental Research Symposium*, Cambridge, 2: 893–907 (Sep. 1997).

(Continued)

Primary Examiner—James O. Wilson
Assistant Examiner—Everett White

(57) ABSTRACT

A method of making a carboxylated carbohydrate is disclosed, cellulose being a preferred carbohydrate material. Carboxylated cellulose fibers can be produced whose fiber strength and degree of polymerization is not significantly sacrificed. The method involves the use of a catalytic amount of a hindered cyclic oxammonium compounds as a primary oxidant and chlorine dioxide as a secondary oxidant in an aqueous environment. The oxammonium compounds may be formed in situ from their corresponding amine, hydroxylamine, or nitroxyl compounds. The oxidized cellulose may be stabilized against D.P. loss and color reversion by further treatment with an oxidant such as sodium chlorite or a chlorine dioxide/hydrogen peroxide mixture. Alternatively it may be treated with a reducing agent such as sodium borohydride. In the case of cellulose the method results in a high percentage of carboxyl groups located at the fiber surface. The product is especially useful as a papermaking fiber where it contributes strength and has a higher attraction for cationic additives. The product is also useful as an additive to recycled fiber to increase strength. The method can be used to improve properties of either virgin or recycled fiber. It does not require high α-cellulose fiber but is suitable for regular market pulps.

37 Claims, No Drawings

OTHER PUBLICATIONS

Besemer, A. C., A. E. J. de Nooy. and H. van Bekkum. Methods for selective oxidation of cellulose: Preparation of 2,3–dicarboxycellulose and 6–carboxy– cellulose. In *Cellulose Derivatives*, T. J. Heinze and W. G. Glasser eds., Ch. 5, pp 73–82 (1996).

Chang, P. S. and J. F. Robyt. Oxidation of primary alcohol groups of naturally occurring polysaccharides with 2,2,6,6–tetramethylpiperidine oxoammonium ion. *Journal of Carbohydrate Chemistry* 15(7): 819–830 (1996).

Datye, K. V. and G. M. Nabar. Studies in the reaction of formaldehyde with unmodified, modified, and dyed celluloses. Part III: The reaction of formaldehyde and oxycelluloses. *Textile Research Journal* 33(7): 500–510 (1963).

Davis, N. J. and S. L. Flitsch. Selective oxidation of monosaccharide derivatives to uronic acids. *Tetrahedron Letters* 34(7): 1181–1184 (1993).

Einhorn, J., C. Einhorn, F. Ratajczak, and J–L. Pierre. Efficient and highly selective oxidation of primary alcohols to aldehydes by N–chlorosuccinimide mediated by oxammonium salts. *Journal of Organic Chemistry* 61: 7452–7454 (1996).

Ganiev, I. M., Q. K. Timerghazin, A. F. Khalizov, V. V. Shereshovets, I. M. Grigor'ev, and G. A. Tolskitov. Complex of Chlorine dioxide with TEMPO and its conversion into oxoammonium salt. *Journal of Physical Organic Chemistry* 14: 38–42 (2001).

Isogai, A. Application of stable nitroxyl radical reagents to cellulose modification. *Cellulose Communications* 5(3): 153–164 (1998).

Isogai, A. and Y. Kato. Preparation of polyuronic acid from cellulose by TEMPO–mediated oxidation. *Cellulose* 5: 153–164 (1998).

Kitaoka, T., A. Isogai, and F. Onabe. Surface modification of pulp fibers by TEMPO–mediated oxidation. *Sen'i Gakukai* Preprint 1998.

Kitaoka, T., A Isogai, and F. Onabe. Chemical modification of pulp fibers by TEMPO–mediated oxidation. *Nordic Pulp and Paper Research Journal* 14 (4): 279–284 (1999).

Luner, P., K. P. Vemuri, and B. Leopold. The effect of chemical modification on the mechanical properties of paper. II. Wet strength of oxidized springwood and summerwood southern pine kraft fibers. *Tappi* 50(3): 1127–120 (1967).

Luner, P., K. P. Vemuri, and F. Womeldorff. The effect of chemical modification on the mechanical properties of paper. III. Dry strength of oxidized springwood and summerwood southern pine kraft fibers. *Tappi* 50(5): 227–230 (1967).

de Nooy, A. E. J., A. C. Besemer, and H. van Bekkum. Highly selective TEMPO mediated oxidation of primary alcohol groups in polysaccharides. *Receuil des Traveau Chimiques des Pays–Bas* 113(3): 165–166 (1994).

de Nooy, A. E. J., A. C. Besemer, and H. van Bekkum. Highly selective nitroxyl radical–mediated oxidation of primary alcohol groups in water soluble glucans. *Carbohydrate Research* 269:89–98 (1995).

de Nooy, A. E. J., A. C. Besemer, and H. van Beckum. On the use of stable organic nitroxyl radicals for the oxidation of primary and secondary alcohols. *Synthesis: Journal of Synthetic Organic Chemistry* Oct. 1996 pp 1153–1174.

Shenai, V. A. and A. S. Narkhede. Hypochlorite oxidation of cellulose in the presence of cobalt sulfide. *Textile Dyer and Printer* 20: 17–22 (1987).

Shet, R. T. and A. M. Yabani. Crease–recovery and tensile–strength properties of unmodified and modified cotton cellulose treated with crosslinking agents. *Textile Research Journal* 51(11): 740–744 (1981).

Young, R. A. Bonding of oxidized cellulose fibers and interaction with wet strength resins. *Wood and Fiber* 10(2): 112–119 (1978).

Zhao, M., J. Li, E. Mano, Z. Song, D. M. Tschaen, E. J. J. Grabowski, and P. J. Reider. Oxidation of primary alcohols to carboxylic acids with sodium chlorite catalyzed by TEMPO and bleach. *Journal of Organic Chemistry* 64: 2564–2566 (1999).

* cited by examiner

HYPOCHLORITE FREE METHOD FOR PREPARATION OF STABLE CARBOXYLATED CARBOHYDRATE PRODUCTS

The present invention is a process for preparation of carboxylated carbohydrates having available primary hydroxyl groups. It is particularly applicable for preparation of a heat and light stable fibrous carboxylated cellulose suitable for papermaking and related applications. The cellulose product of the invention is one in which fiber strength and degree of polymerization are not significantly sacrificed. The process is particularly environmentally advantageous since no chlorine or hypochlorite compounds are required.

BACKGROUND OF THE INVENTION

Carbohydrates are polyhydroxy aldehyde or ketone compounds or substances that yield these compounds on hydrolysis. They frequently occur in nature as long chain polymers of simple sugars. As the term is used in the present invention it is intended to be inclusive of any monomeric, oligomeric, and polymeric carbohydrate compound which has a primary hydroxyl group available for reaction.

Cellulose is a carbohydrate consisting of a long chain of glucose units, all β-linked through the 1'–4 positions. Native plant cellulose molecules may have upwards of 2200 anhydroglucose units. The number of units is normally referred to as degree of polymerization or simply D.P. Some loss of D.P. inevitably occurs during purification. A D.P. approaching 2000 is usually found only in purified cotton linters. Wood derived celluloses rarely exceed a D.P. of about 1700. The structure of cellulose can be represented as follows:

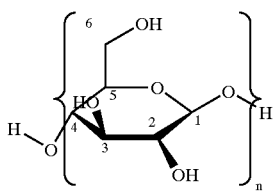

Chemical derivatives of cellulose have been commercially important for almost a century and a half. Nitrocellulose plasticized with camphor was the first synthetic plastic and has been in use since 1868. A number of cellulose ether and ester derivatives are presently commercially available and find wide use in many fields of commerce. Virtually all cellulose derivatives take advantage of the reactivity of the three available hydroxyl groups. Substitution at these groups can vary from very low; e.g. about 0.01 to a maximum 3.0. Among important cellulose derivatives are cellulose acetate, used in fibers and transparent films; nitrocellulose, widely used in lacquers and gun powder; ethyl cellulose, widely used in impact resistant tool handles; methyl cellulose, hydroxyethyl, hydroxypropyl, and sodium carboxymethyl cellulose, water soluble ethers widely used in detergents, as thickeners in foodstuffs, and in papermaking.

Cellulose itself has been modified for various purposes. Cellulose fibers are naturally anionic in nature as are many papermaking additives. A cationic cellulose is described in Harding et al. U.S. Pat. No. 4,505,775. This has greater affinity for anionic papermaking additives such as fillers and pigments and is particularly receptive to acid and anionic dyes. Jewell et al., in U.S. Pat. No. 5,667,637, teach a low degree of substitution (D.S.) carboxyethyl cellulose which, along with a cationic resin, improves the wet to dry tensile and burst ratios when used as a papermaking additive. Westland, in U.S. Pat. No. 5,755,828 describes a method for increasing the strength of articles made from cross linked cellulose fibers having free carboxylic acid groups obtained by covalently coupling a polycarboxylic acid to the fibers.

For some purposes cellulose has been oxidized to make it more anionic; e.g., to improve compatibility with cationic papermaking additives and dyes. Various oxidation treatments have been used. U.S. Pat. No. 3,575,177 to Briskin et al. describes a cellulose oxidized with nitrogen dioxide useful as a tobacco substitute. The oxidized material may then be treated with a borohydride to reduce functional groups, such as aldehydes, causing off flavors. After this reduction the product may be further treated with an oxidizing agent such as hydrogen peroxide for further flavor improvement. Other oxidation treatments use nitrogen dioxide and periodate oxidation coupled with resin treatment of cotton fabrics for improvement in crease recovery as suggested by R. T. Shet and A. M. Yabani, *Textile Research Journal* November 1981: 740–744. Earlier work by K. V. Datye and G. M. Nabar, *Textile Research Journal*, July 1963: 500–510, describes oxidation by metaperiodates and dichromic acid followed by treatment with chlorous acid for 72 hours or 0.05 M sodium borohydride for 24 hours. Copper number was greatly reduced by borohydride treatment and less so by chlorous acid. Carboxyl content was slightly reduced by borohydride and significantly increased by chlorous acid. The products were subsequently reacted with formaldehyde. P. Luner et al., *Tappi* 50(3): 117–120 (1967) oxidized southern pine kraft spring wood and summer wood fibers with potassium dichromate in oxalic acid. Handsheets made with the fibers showed improved wet strength believed due to aldehyde groups. P. Luner et al., in *Tappi* 50(5): 227–230 (1967) expanded this earlier work and further oxidized some of the pulps with chlorite or reduced them with sodium borohydride. Handsheets from the pulps treated with the reducing agent showed improved sheet properties over those not so treated. R. A. Young, *Wood and Fiber*, 10(2): 112–119 (1978) describes oxidation primarily by dichromate in oxalic acid to introduce aldehyde groups in sulfite pulps for wet strength improvement in papers.

Brasey et al, in U.S. Pat. No. 4,100,341, describe oxidation of cellulose with nitric acid. They note that the reaction was specific at the C6 position and that secondary oxidation at the C2 and C3 positions was not detected. They further note that the product was " . . . stable without the need for subsequent reduction steps or the introduction of further reactants [e.g., aldehyde groups] from which the oxidized cellulose has to be purged".

V. A. Shenai and A. S. Narkhede, *Textile Dyer and Printer* May 20, 1987: 17–22 describe the accelerated reaction of hypochlorite oxidation of cotton yarns in the presence of physically deposited cobalt sulfide. The authors note that partial oxidation has been studied for the past hundred years in conjunction with efforts to prevent degradation during bleaching. They also discuss in some detail the use of 0.1 M sodium borohydride as a reducing agent following oxidation. The treatment was described as a useful method of characterizing the types of reducing groups as well as acidic groups formed during oxidation. The borohydride treatment noticeably reduced copper number of the oxidized cellulose. Copper number gives an estimate of the reducing groups such as aldehydes present on the cellulose. Borohydride treatment also reduced alkali solubility of the oxidized product but this may have been related to an approximate 40% reduction in carboxyl content of the samples.

R. Andersson et al. in *Carbohydrate Research* 206: 340–346 (1990) teach oxidation of cellulose with sodium nitrite in orthophosphoric acid and describe nuclear magnetic resonance elucidation of the reaction products.

An article by P. L. Anelli et al. in *Journal of Organic Chemistry* 54: 2970–2972 (1989) appears to be one of the earlier papers describing oxidation of hydroxyl compounds by oxammonium salts. They employed a system of 2,2,6,6-tetramethyl-piperidinyloxy free radical (TEMPO) with sodium hypochlorite and sodium bromide in a two phase system to oxidize 1,4-butanediol and 1,5-pentanediol.

R. V. Casciani et al, in French Patent 2,674,528 (1992) describe the use of sterically hindered N-oxides for oxidation of polymeric substances, among them alkyl polyglucosides having primary hydroxyl groups. A preferred oxidant was TEMPO although many related nitroxides were suggested. Calcium hypochlorite was present as a secondary oxidant.

N. J. Davis and S. L. Flitsch, *Tetrahedron Letters* 34(7): 1181–1184 (1993) describe the use and reaction mechanism of (TEMPO) with sodium hypochlorite to achieve selective oxidation of primary hydroxyl groups of monosaccharides. Following the Davis et al. paper this route to carboxylation then began to be very actively explored, particularly in the Netherlands and later in the United States. A. E. J. de Nooy et al., in a short paper in *Receuil des Travaux Chimiques des Pays-Bas* 113: 165–166 (1994), report similar results using TEMPO and hypobromite for oxidation of primary alcohol groups in potato starch and inulin. The following year, these same authors in *Carbohydrate Research* 269: 89–98 (1995) report highly selective oxidation of primary alcohol groups in water soluble glucans using TEMPO and a hypochlorite/bromide oxidant.

European Patent Application 574,666 to Kaufhold et al. describes a group of nitroxyl compounds based on TEMPO substituted at the 4-position. These are useful as oxidation catalysts using a two phase system. Formation of carboxylated cellulose did not appear to be contemplated.

PCT published patent application WO 95/07303 (Besemer et al.) describes a method of oxidizing water soluble carbohydrates having a primary alcohol group, using TEMPO, or a related di-tertiary-alkyl nitroxide, with sodium hypochlorite and sodium bromide. Cellulose is mentioned in passing in the background although the examples are principally limited to starches. The method is said to selectively oxidize the primary alcohol at C-6 to carboxyl. None of the products studied were fibrous in nature.

A year following the above noted Besemer PCT publication, the same authors, in *Cellulose Derivatives*, T. J. Heinze and W. G. Glasser, eds., Ch. 5, pp 73–82 (1996), describe methods for selective oxidation of cellulose to 2,3-dicarboxy cellulose and 6-carboxy cellulose using various oxidants. Among the oxidants used were a periodate/chlorite/hydrogen peroxide system, oxidation in phosphoric acid with sodium nitrate/nitrite, and with TEMPO and a hypochlorite/bromide primary oxidant. Results with the TEMPO system were poorly reproduced and equivocal. The statement that " . . . some of the material remains undissolved" was puzzling. In the case of TEMPO oxidation of cellulose, little or none would have been expected to go into water solution unless the cellulose was either badly degraded and/or the carboxyl substitution was very high. The homogeneous solution of cellulose in phosphoric acid used for the sodium nitrate/sodium nitrite oxidation was later treated with sodium borohydride to remove any carbonyl function present.

De Nooy et al. have published a very extensive review, both of the literature and the chemistry of nitroxyls as oxidizers of primary and secondary alcohols, in *Synthesis: Journal of Synthetic Organic Chemistry* (10): 1153–1174 (1996).

Heeres et al., in PCT application WO 96/38484, discuss oxidation of carbohydrate ethers useful as sequestering agents. They use the TEMPO oxidation system described by the authors just noted above to produce relatively highly substituted products, including cellulose.

P.-S. Chang and J. F. Robyt, *Journal of Carbohydrate Chemistry* 15(7): 819–830 (1996), describe oxidation of ten polysaccharides including α-cellulose at 0° C. and 25° C. using TEMPO with sodium hypochlorite and sodium bromide. Ethanol addition was used to quench the oxidation reaction. The resulting oxidized α-cellulose had a water solubility of 9.4%. The authors did not further describe the nature of the α-cellulose. It is presumed to have been a so-called dissolving pulp or cotton linter cellulose.

Heeres et al., in WO 96/36621, describe a method of recovering TEMPO and its related compounds following their use as an oxidation catalyst. An example is given of the oxidation of starch followed by TEMPO recovery using azeotropic distillation.

D. Barzyk et al., in *Journal of pulp and paper Science* 23(2): J59–J61 (1997) and in *Transactions of the 11th Fundamental Research Symposium*, Vol. 2, 893–907 (1997), note that carboxyl groups on cellulose fibers increase swelling and impact flexibility, bonded area and strength. They designed experiments to increase surface carboxylation of fibers. However, they ruled out oxidation to avoid fiber degradation and chose to form carboxymethyl cellulose in an isopropanol/methanol system.

Isogai, A. and Y. Kato, in *Cellulose* 5: 153–164 (1998) describe treatment of several native, mercerized, and regenerated celluloses with TEMPO to obtain water soluble and insoluble polyglucuronic acids. They note that the water soluble products had almost 100% carboxyl substitution at the C-6 site. They further note that oxidation proceeds heterogeneously at the more accessible regions on solid cellulose.

Isogai, in *Cellulose Communications* 5(3): 136–141 (1998) describes preparation of water soluble oxidized cellulose products using mercerized or regenerated celluloses as starting materials in a TEMPO oxidation system. Using native celluloses or bleached wood pulp he was unable to obtain a water soluble material since he achieved only low amounts of conversion. He further notes the beneficial properties of the latter materials as papermaking additives.

Kitaoka et al., in a preprint of a short 1998 paper for Sen 'i Gakukai (Society of Studies of Fiber) speak of their work in the surface modification of fibers using a TEMPO mediated oxidation system. They were concerned with the receptivity of alum-based sizing compounds.

PCT application WO 99/23117 (Viikari et al.) teaches oxidation using TEMPO in combination with the enzyme laccase or other enzymes along with air or oxygen as the effective oxidizing agents of cellulose fibers, including kraft pine pulps.

Kitaoka, T., A., A. Isogai, and F. Onabe, in *Nordic Pulp and Paper Research Journal*, 14(4): 279–284 (1999), describe the treatment of bleached hardwood kraft pulp using TEMPO oxidation. Increasing amounts of carboxyl content gave some improvement in dry tensile index, Young's modulus and brightness, with decreases in elongation at breaking point and opacity. Other strength properties were unaffected. Retention of PAE-type wet strength resins was somewhat increased. The products described did not have any stabilization treatment after the TEMPO oxidation.

Van der Lugt et al., in WO 99/57158, describe the use of peracids in the presence of TEMPO or another di-tertiary alkyl nitroxyl for oxidation of primary alcohols in carbohydrates. They claim their process to be useful for producing uronic acids and for introducing aldehyde groups which are suitable for crosslinking and derivitization. Among their examples are a series of oxidations of starch at pH ranges from 5–10 using a system including TEMPO, sodium bromide, EDTA, and peracetic acid. Carboxyl substitution was relatively high in all cases, ranging from 26–91% depending on reaction pH.

Besemer et al. in PCT published application WO 00/50388 teach oxidation of various carbohydrate materials in which the primary hydroxyls are converted to aldehyde groups. The system uses TEMPO or related nitroxyl compounds in the presence of a transition metal using oxygen or hydrogen peroxide.

Jaschinski et al. In PCT published application WO 00/50462 teach oxidation of TEMPO oxidized bleached wood pulps to introduce carboxyl and aldehyde groups at the C6 position. The pulp is preferably refined before oxidation. One process variation uses low pH reaction conditions without a halogen compound present. The TEMPO is regenerated by ozone or another oxidizer, preferably in a separate step. In particular, the outer surface of the fibers are said to be modified. The products were found to be useful for papermaking applications.

Jetten et al. in related PCT applications WO 00/50463 and WO 00/50621 teach TEMPO oxidation of cellulose along with an enzyme or complexes of a transition metal. A preferred complexing agent is a polyamine with at least three amino groups separated by two or more carbon atoms. Manganese, iron, cobalt, and copper are preferred transition metals. Although aldehyde substitution at C6 seems to be preferred, the primary products can be further oxidized to carboxyl groups by oxidizers such as chlorites or hydrogen peroxide.

TEMPO catalyzed oxidation of primary alcohols of various organic compounds is reported in U.S. Pat. No. 6,031,101 to Devine et al. and U.S. Pat. No. 6,127,573 to Li et al. The oxidation system is a buffered two phase system employing TEMPO, sodium chlorite, and sodium hypochlorite. The above investigators are joined by others in a corresponding paper to Zhao et al. *Journal of Organic Chemistry* 64: 2564–2566 (1999). Similarly, Einhorn et al., *Journal of Organic Chemistry* 61: 7452–7454 (1996) describe TEMPO used with N-chlorosuccinimide in a two phase system for oxidation of primary alcohols to aldehydes.

I. M. Ganiev et al in *Journal of Physical Organic Chemistry* 14: 38–42 (2001) describe a complex of chlorine dioxide with TEMPO and its conversion into oxammonium salt. Specific applications of the synthesis product were not noted.

Isogai, in Japanese Kokai 2001-4959A, describes treating cellulose fiber using a TEMPO/hypochlorite oxidation system to achieve low levels of surface carboxyl substitution. The treated fiber has good additive retention properties without loss of strength when used in papermaking applications.

Published European Patent Applications 1,077,221; 1,077,285; and 1,077,286 to Cimecioglu et al. respectively describe a polysaccharide paper strength additive, a paper product, and a modified cellulose pulp in which aldehyde substitution has been introduced using a TEMPO/hypochlorite system.

Published PCT application WO 01/29309 to Jewell et al. describes a cellulose fiber carboxylated using TEMPO or its related compounds which is stabilized against color or D.P. degradation by the use of a reducing or additional oxidizing step to eliminate aldehyde or ketone substitution introduced during the primary oxidation.

None of the previous workers have described a stable fibrous carboxylated cellulose or related carbohydrate material that can be made and used in conventional papermill equipment, using environmentally friendly chemicals, with no requirement for hypochlorites.

SUMMARY OF THE INVENTION

The present invention is directed to a method for preparation of a carboxylated carbohydrate product using a catalytic amount of a hindered cyclic oxammonium salt as the effective primary oxidant. This may be generated in situ by the use of a corresponding amine, hydroxylamine, or nitroxide. The catalyst is not consumed and may be recycled for reuse. The method does not require an alkali metal or alkaline earth hypohalite compound as a secondary oxidant to regenerate the oxammonium salt. Instead, chlorine dioxide has proved to be very satisfactory for this function. If maximum stability of the product is desired, the initially oxidized product may be treated, preferably with a tertiary oxidant or, alternatively, a reducing agent, to convert any unstable substituent groups into carboxyl or hydroxyl groups.

In the discussion and claims that follow, the terms nitroxide, oxammonium salt, amine, or hydroxylamine of a corresponding hindered heterocyclic amine compound should be considered as full equivalents. The oxammonium salt is the catalytically active form but this is an intermediate compound that is formed from a nitroxide, continuously used to become a hydroxylamine, and then regenerated, presumably back to the nitroxide. The secondary oxidant will convert the amine form to the free radical nitroxide compound. Unless otherwise specified, the term "nitroxide" will normally be used hereafter in accordance with the most common usage in the related literature.

The method is broadly applicable to many carbohydrate compounds having available primary hydroxyl groups, of which only one is cellulose. The terms "cellulose" and "carbohydrate" should thus be considered equivalents when used hereafter.

The method is suitable for carboxylation of many carbohydrate products such as simple sugars, relatively low molecular weight oligomers of sugars, starches, chitin, chitosan and many others that have an accessible primary hydroxyl group. Cellulose is preferred carbohydrate material and a chemically purified fibrous cellulose market pulp is a particularly preferred raw material for the process. This may be, but is not limited to, bleached or unbleached sulfite, kraft, or prehydrolyzed kraft hardwood or softwood pulps or mixtures of hardwood and softwood pulps. While included within the broad scope of the invention, so-called high alpha cellulose or chemical pulps; i.e., those with an α-cellulose content greater than about 92%, are not generally preferred as raw materials.

The suitability of lower cost market pulps is a significant advantage of the process. Market pulps are used for many products such as fine papers, diaper fluff, paper towels and tissues, etc. These pulps generally have about 86–88% α-cellulose and 12–14% hemicellulose whereas the high α-cellulose chemical or dissolving pulps have about 92–98% α-cellulose. By stable is meant minimum D.P. loss in alkaline environments, and very low self cross linking and color reversion. The method of the invention is particularly advantageous for treating secondary (or recycled) fibers. Bond strength of the sheeted carboxylated fibers is significantly improved over untreated recycled fiber.

The "cellulose" used with the present invention is preferably a wood based cellulose market pulp below 90% α-cellulose, generally having about 86–88% α-cellulose and a hemicellulose content of about 12%.

The process of the invention will lead to a product having an increase in carboxyl substitution over the starting material of at least about 2 meq/110 g, preferably at least about 5 meq/100 g. Carboxylation occurs predominantly at the hydroxyl group on C-6 of the anhydroglucose units to yield uronic acids.

The cellulose fiber in an aqueous slurry or suspension is first oxidized by addition of a primary oxidizer comprising a cyclic oxammonium salt. This may conveniently be formed in situ from a corresponding amine, hydroxylamine or nitroxyl conpound which lacks any α-hydrogen substitution on either of the carbon atoms adjacent the nitroxyl nitrogen atom. Substitution on these carbon atoms is preferably a one or two carbon alkyl group. For sake of convenience in description it will be assumed, unless otherwise noted, that a nitroxide is used as the primary oxidant and that term should be understood to include all of the percursors of the corresponding nitroxide or its oxammonium salt.

Nitroxides having both five and six membered rings have been found to be satisfactory. Both five and six membered rings may have either a methylene group or a heterocyclic atom selected from nitrogen, sulfur or oxygen at the four position in the ring, and both rings may have one or two substituent groups at this location.

A large group of nitroxide compounds have been found to be suitable. 2,2,6,6-tetramethylpiperidinyl-1-oxy free radical (TEMPO) is among the exemplary nitroxides found useful. Another suitable product linked in a mirror image relationship to TEMPO is 2,2,2'2',6,6,6',6'-octamethyl-4,4'-bipiperidinyl-1,1'-dioxy di-free radical (BI-TEMPO). Similarly, 2,2,6,6-tetramethyl-4-hydroxypiperidinyl-1-oxy free radical; 2,2,6,6-tetramethyl-4-methoxypiperidinyl-1-oxy free radical; and 2,2,6,6-tetramethyl-4-benzyloxypiperidinyl-1-oxy free radical; 2,2,6,6-tetramethyl-4-aminopiperidinyl-1-oxy free radical; 2,2,6,6-tetramethyl-4-acetylaminopiperidinyl-1-oxy free radical; 2,2,6,6-tetramethyl-4-piperidone-1-oxy free radical and ketals of this compound are examples of compounds with substitution at the 4 position of TEMPO that have been found to be very satisfactory oxidants. Among the nitroxides with a second hetero atom in the ring at the four position (relative to the nitrogen atom), 3,3,5,5-tetramethylmorpholine-1-oxy free radical (TEMMO) is useful.

The nitroxides are not limited to those with saturated rings. One compound anticipated to be a very effective oxidant is 3,4-dehydro-2,2,6,6-tetramethyl-piperidinyl-1-oxy free radical.

Six membered ring compounds with double substitution at the four position have been especially useful because of their relative ease of synthesis and lower cost. Exemplary among these are the 1,2-ethanediol, 1,3-propanediol, 2,2-dimethyl-1-3-propanediol (1,3-neopentyldiol) and glyceryl cyclic ketals of 2,2,6,6-tetramethyl-4-piperidone-1-oxy free radical.

Among the five membered ring products, 2,2,5,5-tetramethyl-pyrrolidinyl-1-oxy free radical is anticipated to be very effective.

The above named compounds should only be considered as exemplary among the many representatives of the nitroxides suitable for use with the invention and those named are not intended to be limiting in any way.

During the oxidation reaction the nitroxide is consumed and converted to an oxammonium salt then to a hydroxylamine. Evidence indicates that the nitroxide is continuously regenerated by the presence of a secondary oxidant. Chlorine dioxide, or a latent source of chlorine dioxide, is a preferred secondary oxidant. Since the nitroxide is not irreversibly consumed in the oxidation reaction only a catalytic amount of it is required. During the course of the reaction it is the secondary oxidant which will be depleted.

The amount of nitroxide required is in the range of about 0.005% to 1.0% by weight based on carbohydrate present, preferably about 0.02–0.25%. The nitroxide is known to preferentially oxidize the primary hydroxyl which is located on C-6 of the anhydroglucose moiety in the case of cellulose or starches. It can be assumed that a similar oxidation will occur at primary alcohol groups on hemicellulose or other carbohydrates having primary alcohol groups.

The chlorine dioxide secondary oxidant is present in an amount of 0.2–35% by weight of the carbohydrate being oxidized, preferably about 0.5–10% by weight.

As was noted earlier, it is considered to be within the scope of the invention to form nitroxides or their oxammonium salts in situ by oxidation of the corresponding amines or hydroxylamines of any of the nitroxide free radical products. While the free radical form of the selected nitroxide may be used, it is often preferable to begin with the corresponding amine. Among the many possible amino compounds useful as starting materials can be mentioned 2,2,6,6-tetramethylpiperidine, 2,2,6,6-tetramethyl-4-piperidone (triacetone amine) and its 1,2-ethanediol, 1,3-propanediol, 2,2-dimethyl-1,3-propanediol and glyceryl cyclic ketals.

When cellulose is the carbohydrate being treated, the usual procedure is to slurry the cellulose fiber in water with a small amount of sodium bicarbonate or another buffering material for pH control. The pH of the present process is not highly critical and may be within the range of about 4–12, preferably about 6–8. The nitroxide may be added in aqueous solution and chlorine dioxide added separately or premixed with the nitroxide. If the corresponding amine is used, they are preferably first reacted in aqueous solution with chlorine dioxide at somewhat elevated temperature. Additional chlorine dioxide is added to the cellulose slurry and the catalytic solution is then added and allowed to react, preferably at elevated temperature for about 30 seconds to 10 hours at temperatures from about 5°–110° C., preferably about 20°–95° C.

To achieve maximum stability and D.P. retention the oxidized product may be treated with a stabilizing agent to convert any substituent groups, such as aldehydes or ketones, to hydroxyl or carboxyl groups. The stabilizing agent may either be another oxidizing agent or a reducing agent. Unstabilized oxidized cellulose pulps have objectionable color reversion and may self crosslink upon drying, thereby reducing their ability to redisperse and form strong bonds when used in sheeted products. If sufficient unreacted $ClO_2$ remains after the initial oxidation, it is only necessary to acidify the initial reaction mixture without even draining or washing the product. Otherwise one of the following oxidation treatments may be used.

Alkali metal chlorites are one class of oxidizing agents used as stabilizers, sodium chlorite being preferred because of the cost factor. Other compounds that may serve equally well as oxidizers are permanganates, chromic acid, bromine, silver oxide, and peracids. A combination of chlorine dioxide and hydrogen peroxide is also a suitable oxidizer when used at the pH range designated for sodium chlorite. Oxidation using sodium chlorite may be carried out at a pH in the range of about 0–5, preferably 2–4, at temperatures between about 10°–110° C., preferably about 20°–95° C., for times from about 0.5 minutes to 50 hours, preferably about 10 minutes to 2 hours. One factor that favors oxidants as opposed to reducing agents is that aldehyde groups on the oxidized carbohydrate are converted to additional carboxyl groups, thus resulting in a more highly carboxylated product. These stabilizing oxidizers are referred to as "tertiary oxidizers" to distinguish them from the nitroxide/chlorine dioxide primary/secondary oxidizers. The tertiary oxidizer is used in a molar ratio of about 1.0–15 times the presumed aldehyde content of the oxidized carbohydrate, preferably about 5–10 times. In a more convenient way of measuring the needed tertiary oxidizer, the preferred sodium chlorite usage should fall within about 0.01–20% based on carbohydrate, preferably about 1–9% by weight based on carbohydrate, the chlorite being calculated on a 100% active material basis.

When stabilizing with a $ClO_2$ and $H_2O_2$ mixture, the concentration of $ClO_2$ present should be in a range of about 0.01–20% by weight of carbohydrate, preferably about 0.3–1.0%, and concentration of $H_2O_2$ should fall within the range of about 0.01–10% by weight of carbohydrate, preferably 0.05–1.0%. Time will generally fall within the range of 0.5 minutes to 50 hours, preferably about 10 minutes to 2 hours and temperature within the range of about 10°–110° C., preferably about 30°–95° C. The pH of the system is preferably about 3 but may be in the range of 0–5.

A preferred reducing agent is an alkali metal borohydride. Sodium borohydride ($NaBH_4$) is preferred from the standpoint of cost and availability. However, other borohydrides such as $LiBH_4$, or alkali metal cyanoborohydrides such as $NaBH_3CN$ are also suitable. $NaBH_4$ may be mixed with LiCl to form a very useful reducing agent. When $NaBH_4$ is used for reduction, it should be present in an amount between about 0.1 and 10.0 g/L. A more preferred amount would be about 0.25–5 g/L and a most preferred amount from about 0.5–2.0 g/L. Based on carbohydrate the amount of reducing agent should be in the range of about 0.1% to 4% by weight, preferably about 1–3%. Reduction may be carried out at room or higher temperature for a time between 10 minutes and 10 hours, preferably about 30 minutes to 2 hours.

After stabilization is completed, the carbohydrate is washed and may be dried if desired. Alternatively, the carboxyl substituents may be converted to other cationic forms beside hydrogen or sodium; e.g., calcium, magnesium, or ammonium.

One particular advantage of the process is that all reactions are carried out in an aqueous medium. A further advantage when the process is used with cellulose fiber is that the carboxylation is primarily located on the fiber surface. This conveys highly advantageous properties for papermaking. The product of the invention will have at least about 20% of the total carboxyl content on the fiber surface. Untreated fiber will typically have no more than a few milliequivalents of total carboxyl substitution and, of this, no more than about 10% will be located on the fiber surface.

Carboxylated cellulose made using the process of the invention is highly advantageous as a papermaking furnish, either by itself or in conjunction with conventional fiber. It may be used in amounts from 0.5–100% of the papermaking furnish. The carboxylated fiber is especially useful in admixture with recycled fiber to add strength. The method can be used to improve properties of either virgin or recycled fiber. The increased number of anionic sites on the fiber should serve to ionically hold significantly larger amounts of cationic papermaking additives than untreated fiber. These additives may be wet strength resins, sizing chemical emulsions, filler and pigment retention aids, charged filler particles, dyes and the like. Carboxylated pulps do not hornify (or irreversibly collapse) as much on drying and are a superior material when recycled. They swell more on rewetting, take less energy to refine, and give higher sheet strength.

It is a primary object of the invention to provide a convenient method whereby carboxyl substitution may be introduced into carbohydrate materials having primary hydroxyl groups.

It is an important object of the invention to provide a method of making a cellulose fiber having enhanced carboxyl content using an aqueous reaction medium.

It is also an object to provide a method for making a carboxylated cellulose fiber that does not employ chlorine or hypohalite compounds.

It is another object to provide a process for making a carboxylated cellulose fiber that can be carried out in equipment and with many chemicals commonly found in pulp or paper mills.

It is a further object to provide a cellulose fiber having an enhanced carboxyl content at the fiber surface.

It is yet an object to provide a carboxylated cellulose fiber that is stable against D.P. loss in alkaline environments.

It is an object to provide a stable cellulose fiber of enhanced carboxyl content with a D.P. of at least 850 measured as a sodium salt or 700 when measured in the free acid form.

It is still an object to provide a cellulose fiber having a high ionic attraction to cationic papermaking additives.

It is an additional object to provide cellulose pulp and paper products containing the carboxyl enhanced fiber.

These and many other objects will become readily apparent upon reading the following detailed description taken in conjunction with the drawings

DETAILED DESCRIPTION OF THE PREFERRED EMBODIMENTS

Abundant laboratory data indicates that a nitroxide catalyzed cellulose oxidation predominantly occurs at the primary hydroxyl group on C-6 of the anhydroglucose moeity. In contrast to some of the other routes to oxidized cellulose, only very minor reaction has been observed to occur at the secondary hydroxyl groups at the C-2 and C-3 locations. Using TEMPO as an example, the mechanism to formation of a carboxyl group at the C-6 location proceeds through an intermediate aldehyde stage.

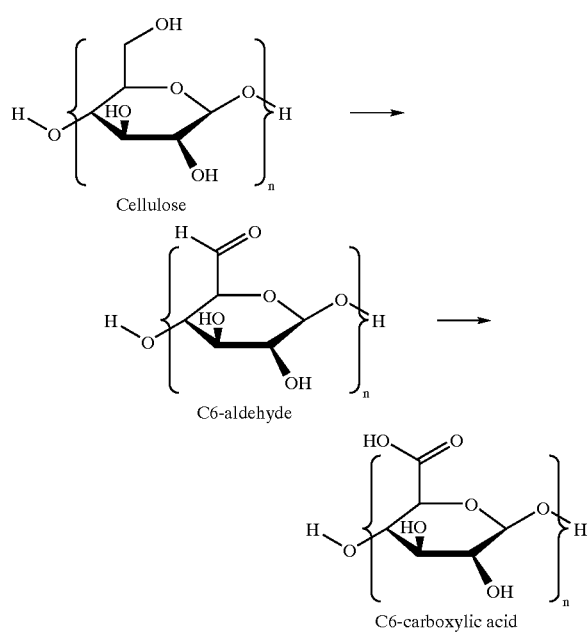

Cellulose

C6-aldehyde

C6-carboxylic acid

The TEMPO is not irreversibly consumed in the reaction but is continuously regenerated. It is converted by the secondary oxidant into the oxammonium (or nitrosonium) ion which is the actual oxidant. During oxidation the oxammonium ion is reduced to the hydroxylamine from which TEMPO is again formed. Thus, it is the secondary oxidant which is actually consumed. TEMPO may be reclaimed or recycled from the aqueous system. The reaction is postulated to be as follows:

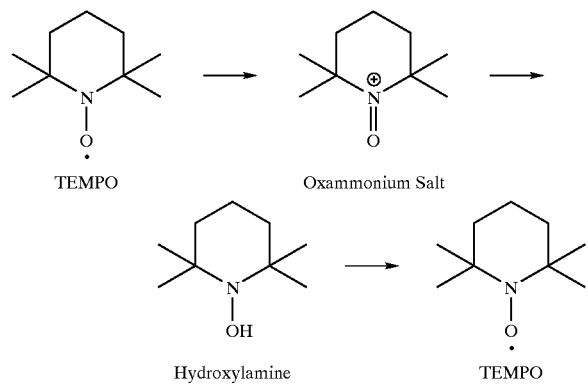

TEMPO    Oxammonium Salt

Hydroxylamine    TEMPO

As was noted earlier, formation of the oxammonium salt in situ by oxidation of the hydroxylamine or the amine is considered to be within the scope of the invention.

The resulting oxidized cellulose product will have a mixture of carboxyl and aldehyde substitution. Aldehyde substituents on cellulose are known to cause degeneration over time and under certain environmental conditions. In addition, minor quantities of ketone carbonyls may be formed at the C-2 and C-3 positions of the anhydroglucose units and these will also lead to degradation. Marked D.P., fiber strength loss, crosslinking, and yellowing are among the problems encountered. For these reasons, we have found it very desirable to oxidize aldehyde substituents to carboxyl groups, or to reduce aldehyde and ketone groups to hydroxyl groups, to ensure stability of the product.

The following groups of nitroxyl compounds and their corresponding amines or hydroxylamines are known to be effective primary oxidants:

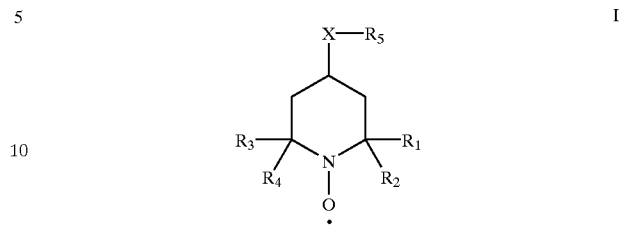

I in which $R_1$–$R_4$ are one to four carbon alkyl groups but $R_1$ with $R_2$ and $R_3$ with $R_4$ may together be included in a five or six carbon alicyclic ring structure; X is sulfur or oxygen; and $R_5$ is hydrogen, $C_1$–$C_{12}$ alkyl, benzyl, 2-dioxanyl, a dialkyl ether, an alkyl polyether, or a hydroxyalkyl, and X with $R_5$ being absent may be hydrogen or a mirror image moiety to form a bipiperidinyl nitroxide. Specific compounds in this group known to be very effective are 2,2,6,6-tetramethylpiperidinyl-1-oxy free radical (TEMPO); 2,2,2',2',6,6,6',6'-octamethyl-4,4'-bipiperidinyl-1,1'-dioxy di-free radical (BI-TEMPO); 2,2,6,6-tetramethyl-4-hydroxypiperidinyl-1-oxy free radical (4-hydroxy-TEMPO); 2,2,6,6-tetramethyl-4-methoxypiperidinyl-1-oxy free radical (4-methoxy-TEMPO); and 2,2,6,6-tetramethyl-4-benzyloxypiperidinyl-1-oxy free radical (4-benzyloxy-TEMPO).

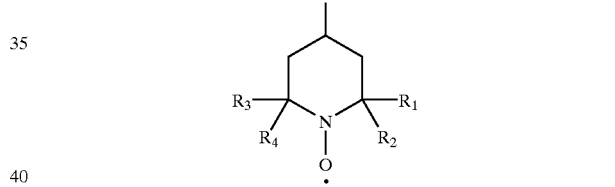

II in which $R_1$–$R_4$ are one to four carbon alkyl groups but $R_1$ with $R_2$ and $R_3$ with $R_4$ may together be included in a five or six carbon alicyclic ring structure; $R_6$ is hydrogen or $C_1$–$C_5$ alkyl; $R_7$ is hydrogen, $C_1$–$C_8$ alkyl, phenyl, carbamoyl, alkyl carbamoyl, phenyl carbamoyl, or $C_1$–$C_8$ acyl. Exemplary of this group is 2,2,6,6-tetramethyl-4-aminopiperidinyl-1-oxy free radical (4-aminoTEMPO); and 2,2,6,6-tetramethyl-4-acetylaminopiperidinyl-1-oxy free radical (4-acetylamino-TEMPO).

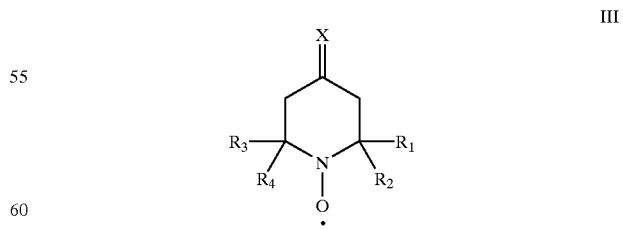

III in which $R_1$–$R_4$ are one to four carbon alkyl groups but $R_1$ with $R_2$ and $R_3$ with $R_4$ may together be included in a five or six carbon alicyclic ring structure; and X is oxygen, sulfur, NH, N-alkyl, NOH, or $NOR_8$ where $R_8$ is lower alkyl. An example might be 2,2,6,6-tetramethyl-4-oxopiperidinyl- 1-oxy free radical (2,2,6,6-tetramethyl-4-piperidone-1-oxy free radical).

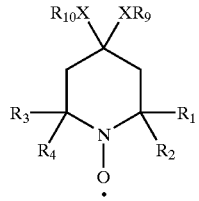

VI wherein $R_1$–$R_4$ are one to four carbon alkyl groups but $R_1$ with $R_2$ and $R_3$ with $R_4$ may be linked into a five or six carbon alicyclic ring structure; X is oxygen, sulfur, -alkyl amino, or acyl amino. An example is 3,3,5,5-tetramethylmorpholine-4-oxy free radical. In this case the oxygen atom takes precedence for numbering but the dimethyl substituted carbons remain adjacent the nitroxide moiety.

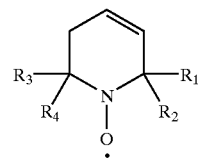

V wherein $R_1$–$R_4$ are one to four carbon alkyl groups but $R_1$ with $R_2$ and $R_3$ with $R_4$ may be linked into a five or six carbon alicyclic ring structure. An example of a suitable compound is 3,4-dehydro-2,2,6,6,-tetramethylpiperidinyl-1-oxy free radical.

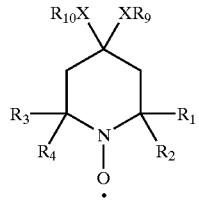

VI wherein $R_1$–$R_4$ are one to four carbon alkyl groups but $R_1$ with $R_2$ and $R_3$ with $R_4$ may together be included in a five or six carbon alicyclic ring structure; X is methylene, oxygen, sulfur, or alkylamino; and $R_9$ and $R_{10}$ are one to five carbon alkyl groups and may together be included in a five or six member ring structure, which, in turn may have one to four lower alkyl or hydroxy alkyl substitutients. Examples include the 1,2-ethanediol, 1,3-propanediol, 2,2-dimethyl-1,3-propanediol, and glyceryl cyclic ketals of 2,2,6,6-tetramethyl-4-piperidone-1-oxy free radical. These compounds are especially preferred primary oxidants because of their effectiveness, lower cost, ease of synthesis, and suitable water solubility.

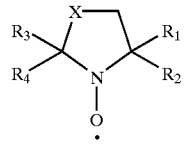

VII in which $R_1$–$R_4$ are one to four carbon alkyl groups but $R_1$ with $R_2$ and $R_3$ with $R_4$ may together be included in a five or six carbon alicyclic ring structure; and X may be methylene, sulfur, oxygen, —NH, or $NR_{11}$, in which $R_{11}$ is a lower alkyl. An example of these five member ring compounds is 2,2,5,5-tetramethylpyrrolidinyl-1-oxy free radical.

Where the term "lower alkyl" is used it should be understood to mean an aliphatic straight or branched chain alkyl moiety having from one to four carbon atoms.

In the following examples, unless otherwise specified, the cellulose used was a bleached, never dried northern softwood kraft wet lap market pulp produced in an Alberta mill.

EXAMPLE 1

Use of the Glyceryl Ketal of Triacetone Amine to Form the Primary Oxidizing Agent The glyceryl ketal of triacetone amine (gk-TAA) is 7,7,9,9-tetramethyl-1,4-dioxa-8-azaspiro[4.5]decane-2-methanol. This is a commercially available chemical. However, it may be synthesized by reaction of 2,2,6,6-tetramethyl-4-piperidone with glycerine under strongly acidic conditions.

Part 1: 10.3 mg of gk-TAA was reacted with 2 g of a 6.7 g/L solution of $ClO_2$ at 60° for about 2 minutes. To this was then added an additional 2 g of the $ClO_2$ solution and the reaction continued for an additional 2 minutes at 60° C. The reaction mixture was added to 30 mL of the $ClO_2$ solution and 60 mL water. This solution was placed in a sealable polyethylene bag and to it was then added a 45 g wet sample (10 g O.D. basis) of cellulose combined with 1 g $NaHCO_3$. The pH at this time was 7.3. The bag with its contents was placed in a 60–70° C. water bath for 31 minutes. The oxidized pulp was drained leaving a wet mass of 34 g. The 98 g of liquor recovered was retained in order to recycle the catalyst. A small portion of the oxidized pulp was retained for analysis. The remainder was stabilized by adjusting the pH to about 3 with 1 M $H_2SO_4$ solution and adding 30 mL of the 6.7 g/l $ClO_2$ solution, 3 mL of 3% $H_2O_2$, and 40 mL water. The stabilization reaction was continued for about 1 hour at 60°–70° C. The pulp was washed and converted to the sodium form by treating it in a solution of $Na_2CO_3$ at about pH 8–9.

Part 2: The recovered liquor from the oxidation step above was combined with 41 g (10 g O.D.) of the never dried cellulose pulp, 30 mL of the 6.7 g/L $ClO_2$ solution and 1 g $NaHCO_3$. These were placed in a sealed polyethylene bag as before and reacted in a 60–70° C. water bath for 40 minutes. The oxidized pulp was drained and stabilized as above.

Carboxyl contents of the materials made above were determined to be as follows:

| Sample | Carboxyl, meq/100 g |
|---|---|
| Part 1, unstabilized | 7.7 |
| Part 1, stabilized | 11.7 |
| Part 2, Unstabilized | 7.0 |
| Part 2, Stabilized | 12.3 |

These results indicate both the efficiency of gk-TAA as a primary oxidation catalyst but also show that it may be recycled without loss of efficiency.

EXAMPLE 2

Investigation of Effect of Primary Catalyst Loading

A catalyst solution was made by adding 20.0 mg gk-TAA to ~2.0 g of a solution of 6.7 g/L $ClO_2$ at 70° C. for 1–2 minutes. The gk-TAA appeared to be totally dissolved. Cellulose was oxidized as above using 41 g (10 g O.D.) of the never dried pulp, 0.5 g $NaHCO_3$, 75 mL water, and 14 mL of the 6.7 g/L $ClO_2$ solution. To this was added either 0.11 g, 0.26 g, 0.50 g, or 0.75 g of the catalyst solution. These catalyst additions correspond to 0.011%, 0.026%, 0.050%, and 0.075% by weight based on dry cellulose. After 30 minutes reaction time at 70° C. the samples with the two highest catalyst usages were white in appearance, the next lower usage sample had a faint off-white color and the lowest catalyst usage sample was a light yellow. After 2 hours the samples were removed from the water bath and drained. The unwashed oxidized material was stabilized by treatment with 30 mL of the 6.7 g/l $ClO_2$ solution and 3 g 3% $H_2O_2$. The pH was adjusted to ~1 by 1 M $H_2SO_4$. Treatment was continued for about 30 minutes at 60° C. The samples were then filtered off and washed with deionized water. Carboxyl analyses indicated the following levels of substitution:

| Sample No. | Catalyst, wt % | Carboxyl, meq/100 g |
|---|---|---|
| 1 | 0.011 | 5.5 |
| 2 | 0.026 | 8.6 |
| 3 | 0.050 | 8.7 |
| 4 | 0.075 | 9.4 |

It is evident from the substitution data that carboxylation level is not a linear function of catalyst usage. Little gain was seen using more than 0.026% of the gk-TAA catalyst.

EXAMPLE 3

Use of 1,3-Propanediol Ketal of Triacetone Amine to Form the Primary Oxidizing Agent A catalyst solution was formed by reacting 10.5 mg of the 1,3-propane-diol acetal of triacetone amine and 1.5 mL of a 5.7 g/L solution of $ClO_2$ in a sealed tube for about 1 minute. The resulting dark material readily dissolved in the liquid. Water (75 mL), 0.5 g $NaHCO_3$, 15 mL of the 5.7 g/L $ClO_2$ solution, and the activated catalyst solution, along with a few mL of rinse water were combined in that order. This was combined with 41 g of the wet (10 g O.D.) cellulose and mixed in a sealed polyethylene bag. The mixture was placed in a 70° C. water bath and allowed to react for 33 minutes. The slurry was acidified with 1 M $H_2SO_4$ to ~pH 3. Then 5.0 mL of the 5.7 g/L $ClO_2$ solution and 1.5 mL of 3% $H_2O_2$ were mixed in. The sealed bag was again placed in the 70° C. hot water bath for about 1 hour. The resulting stabilized carboxylated cellulose was washed and dried as before. Carboxyl content was measured as 8.3 meq/100 g.

EXAMPLE 4

Use of TEMPO as a Primary Oxidizing Agent with a $ClO_2$ Secondary Oxidant

A 10.6 g dried sample (10.0 g O.D.) of the northern softwood pulp was slurried in 200 g water with 3 g $NaHCO_3$. Then 0.1 g TEMPO and ~2 mL of a 6 g/L $ClO_2$ solution were combined and gently heated to form an oxidation catalyst. An additional 68 mL of the 6 g/L $ClO_2$ solution was stirred into the pulp slurry, then the catalyst mixture. The slurry was contained in a sealed polyethylene bag and immersed in a 70° C. water bath for 30 minutes. The reacted cellulose was then washed and stabilized by combining 0.7 g 30% $H_2O_2$, 0.7 g $NaClO_2$, wet pulp, and water to make 100 g total. The pH was reduced to below 3 by adding about 1.5 g of 1 M $H_2SO_4$ and the mixture was heated and allowed to react for about 1 hour at 70° C. Analyses showed that the unstabilized material had a carboxyl content of 8.7 meq/100 g while the stabilized sample had 17 meq/100 g carboxyl.

EXAMPLE 5

Use of 2,2,6,6-tetramethylpiperidine to Form Primary Oxidation Catalyst

Rather than use the nitroxide form of TEMPO as a starting catalyst material, the corresponding amine was employed to generate a catalyst. A water solution containing 7.1 g/L $ClO_2$ was prepared. About 5 mL of this was reacted with about 80 mg 2,2,6,6-tetramethylpiperidine to form the oxammonium salt. Then 85–90 mL of the $ClO_2$ solution was combined with 41 g (10.0 g O.D.) of the never dried pulp, 3 g of $NaHCO_3$, and 0.08 g of 3.3% $H_2O_2$. The catalyst solution was added and the whole, contained in a sealed polyethylene bag, was immersed in a 70° C. water bath for 40 minutes. The pH was then adjusted below 3 with 1 M $H_2SO_4$. Then 3 g of 3.3% $H_2O_2$ and 30 mL of the $ClO_2$ solution were mixed in and again placed in the 70° C. water bath for 1 hour for stabilization. The stabilized carboxylated cellulose was washed and dried as before. Carboxyl content was 22 meq/100 g.

EXAMPLE 6

Use of 4-oxo-TEMPO-1,3-propanediol Ketal to Form the Primary Oxidizing Agent A catalyst mixture was formed by mixing 0.10 g of 2,2,6,6-tetramethyl-4-piperidone-3-propanediol ketal was reacted with about 3 g/L of a 6.8 g/L $ClO_2$ solution to form the corresponding catalytic oxammonium compound. Then 41 g (10 g O.D.) of never dried bleached northern softwood kraft pulp was added to 87 mL of the $ClO_2$ solution along with 3 g $NaHCO_3$ followed by the rapid addition of the catalyst solution. The mixture at pH 7.5 was placed in a sealed polyethylene bag and submerged in a 70° C. hot water bath for about 30 minutes. The pH of the reaction mixture was reduced below 3 with 1 M $H_2SO_4$. At this time about 6 g of 3.2% $H_2O_2$ and 30 mL of the 6.8 g/L $ClO_2$ solution were added. The polyethylene bag was again sealed and placed in the 70° C. water bath for 1 hour. The stabilized pulp was then washed and dried as before. Upon analysis the carboxyl content was 23 meq/100 g.

EXAMPLE 7

Effect of Oxidation pH on Carboxyl Content

The catalyst mixture of Example 6 was again made up, this time using a fresh 7.1 g/L solution of $ClO_2$. Instead of the $NaHCO_3$ buffer used earlier, which gave a pH of about 7.5, the buffering system used was a mixture of $Na_2HPO_4$ and citric acid as shown in the table that follows. With the exception of the buffers, the procedure used was generally similar to that of Example 6 with the following exceptions. Only 30 mL of the 7.1 g/L $ClO_2$ solution was used and the initial reaction time was extended to 2¾ hours. Stabilization was under similar conditions except that only 25 mL of the $ClO_2$ solution was used, the temperature was 60° C., and the bags with the samples were removed from the water bath after 1 hour but allowed to remain at room temperature over the weekend. Reaction conditions and carboxyl content were as follows.

| Sample No. | pH | 0.2 M Na₂HPO₄, mL | 0.1 M citric acid, mL | Catalyst, mg | Carboxyl meq/100 g |
|---|---|---|---|---|---|
| 1 | 7.0 | 43.6 | 6.5 | 10.2 | 16 |
| 2 | 6.6 | 36.4 | 13.6 | 10.5 | 17 |
| 3 | 6.2 | 33.1 | 16.9 | 10.1 | 14 |
| 4 | 5.8 | 30.3 | 19.7 | 10.3 | 13 |

It is evident that the pH of the carboxylation reaction with $ClO_2$ is not extremely critical. Contrary to the traditional use of sodium hypochlorite as the secondary oxidant, which requires a pH of about 9–10.5 for best efficiency, the reaction using $ClO_2$ will proceed on the acidic side with little or no reduction in carboxyl substitution.

EXAMPLE 8

Effect of Stabilization on Brightness Reversion of Oxidized Pulps

A catalyst mixture was made by reacting 0.11 g of 2,2,6,6-tetramethylpiperidine with about 25 mL of 6.9 g/L $ClO_2$ solution at 70° C. for a few minutes. Then the activated catalyst, 10 g $NaHCO_3$, 410 g (100 g O.D.) of never dried northern bleached kraft softwood pulp, and 575 mL of the 6.9 g/L % $ClO_2$ solution were intimately mixed. The pH of the mixture was in the 8.0–8.5 range. The sealed container was placed in a 70° C. hot water bath. Gases given off during the reaction were vented as necessary. After 38 minutes the product was divided into two portions. A first portion was washed and treated with a solution of about 2 g/L $Na_2CO_3$ for about 5 minutes at a pH between 9–10. The unstabilized product was then washed with deionized water but left undried. The second portion was stabilized by removing about 200 mL of the remaining reaction liquor which was replaced by an equal amount of a solution of 5.0 g 80% $NaClO_2$, 5.0 g of 3% $H_2O_2$, and 12.8 g of 1M $H_2SO_4$. This was again reacted for 45 minutes at 70° C. The product was drained and washed, treated with basic water at pH ~10, and again washed.

Analyses of the original and two treated samples gave the following results:

| Sample | D.P. | Carboxyl, meq/100 g |
|---|---|---|
| Untreated | 1650 ± 100 | 4.0 ± 0.5 |
| Unstabilized | 650* | 13.7 ± 0.5 |
| Stabilized | 1390 ± 60 | 21.6 ± 0.1 |

*D.P. results of unstabilized materials are unreliable due to degradation in the alkaline cuene solvent.

Handsheets were then made of the above three samples for study of color reversion after accelerated aging. These were dried overnight at room temperature and 50% R.H. Brightness was measured before and after samples were heated in an oven at 105° C. for 1 hour. Heated samples were reconditioned for at least 30 minutes at 50% R.H. Results are as follows:

| Sample | pH | Initial ISO Brightness, % | Oven-aged ISO Brightness, % | Brightness Reversion, % |
|---|---|---|---|---|
| Control | 5 | 89.84 ± 0.13 | 88.37 ± 0.12 | 1.48 |
| Control* | 5 | 90.13 ± 0.07 | 88.61 ± 0.13 | 1.52 |
| Unstabilized | Unadjusted | 91.43 ± 0.16 | 78.85 ± 0.28 | 12.59 |
| Unstabilized | 5 | 91.93 ± 0.08 | 87.38 ± | 4.55 |
| Stabilized | Unadjusted | 92.68 ± 0.09 | 90.74 ± 0.12 | 1.94 |
| Stabilized | 5 | 92.89 ± 0.14 | 91.31 ± 0.12 | 1.57 |

*Base washed before testing

The superior brightness retention of the stabilized samples is immediately evident from the above test results.

EXAMPLE 9

Stabilization Retaining Primary Oxidation Liquor

A catalytic composition was formed by reacting 12 mg of TEMPO and about 2 mL of 7 g/L $ClO_2$ solution at 70° C. for about 1 minute. The activated catalyst was added to a slurry of 41 g (10 g O.D.) of northern mixed conifer bleached kraft pulp and 2 g $Na_2CO_3$ in about 88 mL of the 7 g/L $ClO_2$ solution. The mixture was contained in a sealed polyethylene bag and placed in a 70° C. water bath for 30 minutes. The mixture was occasionally mixed and vented as needed. After the initial oxidation the sample was divided into two equal portions of about 66 g each.

One portion was stabilized by acidification to a pH below 3 with 1 M $H_2SO_4$ and again placed in the hot water bath at 70° C. for 1 hour. No $ClO_2$ or $H_2O_2$ was added. The fiber was then recovered, thoroughly washed, treated with a $Na_2CO_3$ solution at a pH ~10, and again washed and dried.

The second portion was stabilized by treatment with 2.3 g of 3% $H_2O_2$ and then with 1 M $H_2SO_4$ to adjust pH below 3. This too was retained in the hot water bath at 70° C. for 1 hour. The stabilized cellulose was then treated as above.

Carboxyl content was measured for both samples.

| Stabilization Treatment | D.P. | Carboxyl Content meq/100 g |
|---|---|---|
| Neither $H_2O_2$ or $ClO_2$ | 1050 | 21 |
| $H_2O_2$ but no $ClO_2$ | 1100 | 28 |

It is clearly evident that under the initial oxidation conditions employed, no additional oxidants are needed for stabilization and that pH adjustment by acidification is sufficient.

EXAMPLE 10

Oxidation of Starch using $ClO_2$ and the Glyceryl Ketal of Triacetoneamine

A 10.7 mg portion of the glyceryl ketal of triacetoneamine was reacted with about 2 mL of 5.2 g/L $ClO_2$ at 70° C. Then a solution of 61 g of 16.4% (10.0 g O.D.) FilmFlex® 50 starch, which had been solubilized by heating the starch in water, 3 g of $NaHCO_3$, and about 98 mL of the 5.2 g/L $ClO_2$ was prepared. FilmFlex is a registered trademark of Cargill Corp. for a hydroxyethyl corn starch product. The activated catalyst was added. System pH was about 7.5. After about 5 minutes a first small (about 10 g) portion was removed (Sample A). The remainder was placed in a sealed polyethylene bag and then in a 70° C. water bath for 23 minutes. A second portion of about 71 g was then removed from the bag (Sample B). Then 30 mL of the $ClO_2$ solution and 9 mL of 3% $H_2O_2$ was added to the remainder of the material in the bag after the pH had been reduced to about 3 with 1M $H_2SO_4$. The bag was again placed in the 70° C. water bath for 40 minutes (Sample C). The starch remained in solution for all treatments.

An 18 g control sample of the 16.4% FilmFlex® 50 starch was diluted to 50 mL with deionized water. The pH was then adjusted to about 2 with 1 M $H_2SO_4$ (Sample D).

Samples A (about 0.4 g) and B (about 3 g) which had been dried at 105° C. for about 1 hour were dissolved separately in about 10 mL water. The pH was reduced to about 1 with 1 M $H_2SO_4$. Then 25 mL acetone was stirred into each of the samples and later decanted off. Following this 125 mL absolute ethanol divided into four separate aliquots was used to treat the samples so that the product was no longer gummy and was loose and granular in appearance. After each ethanol wash the supernatant liquid was decanted off. The slightly yellow granular washed products were dried at 105° C. for about 1 hour and sent for analysis.

To isolate the treated Sample C starch, 150 mL of acetone was stirred slowly into the solution. After the resulting precipitate had settled, the supernatant liquid was decanted off. Then 150 mL ethanol in four separate portions was added to the gummy precipitate to extract remaining water and chemicals and each time the supernatant was decanted off. The white granular product was oven dried at about 105° C. for 1 hour and a sample submitted for carboxyl analysis.

Sample D was treated in a similar manner except the initial treatment was with 100 mL ethanol rather than acetone. Again the washed material was oven dried at 105° C. for about 1 hr.

Upon analysis, Samples A and D did not have a significant carboxyl content. However, sample B had a carboxyl content of about 29 meq/100 g and sample C about 30 meq/100 g.

It will be evident to those skilled in the art that many reaction conditions, many carbohydrate compounds, and many hindered nitroxide compounds that have not been exemplified will be satisfactory for use with $ClO_2$ as a secondary oxidant. Thus, it is the intent of the inventors that these variations be included within the scope of the invention if encompassed within the following claims.

What is claimed is:

1. A method of making a carboxylated carbohydrate product which comprises: oxidizing a carbohydrate compound by reacting the carbohydrate in an aqueous system with a sufficient amount of a primary oxidant selected from the group consisting of hindered heterocyclic oxammonium salts in which the carbon atoms adjacent the oxammonium nitrogen lack .alpha.-hydrogen substitution, the corresponding amines, hydroxylamines, and nitroxides of these oxammonium salts, and mixtures thereof, in which the nitroxide is 2,2,2',2',6,6,6',6'octa-methyl-4,4'-bipiperidinyl-1,1'-dioxy di-radical, and a secondary oxidant selected from chlorine dioxide and latent sources of chlorine dioxide in a sufficient amount to induce an increase in carboxyl substitution in the carbohydrate of at least 2 meq/100 g.

2. A method of making a carboxylated carbohydrate product which comprises: oxidizing a carbohydrate compound by reacting the carbohydrate in an aqueous system with a sufficient amount of a primary oxidant selected from the group consisting of hindered heterocyclic oxammonium salts in which the carbon atoms adjacent the oxammonium nitrogen lack .alpha.-hydrogen substitution, the corresponding amines, hydroxylamines, and nitroxides of these oxammonium salts, and mixtures thereof, in which the nitroxide is 2,2,6,6-tetramethyl-4-hydroxypiperidinyl-1-oxy free radical, and a secondary oxidant selected from chlorine dioxide and latent sources of chlorine dioxide in a sufficient amount to induce an increase in carboxyl substitution in the carbohydrate of at least 2 meq/100 g.

3. A method of making a carboxylated carbohydrate product which comprises: oxidizing a carbohydrate compound by reacting the carbohydrate in an aqueous system with a sufficient amount of a primary oxidant selected from the group consisting of hindered heterocyclic oxammonium salts in which the carbon atoms adjacent the oxammonium nitrogen lack .alpha.-hydrogen substitution, the corresponding amines, hydroxylamines, and nitroxides of these oxammonium salts, and mixtures thereof, in which the nitroxide is 2,2,6,6-tetramethyl-4-methoxypiperidinyl-1-oxy free radical, and a secondary oxidant selected from chlorine dioxide and latent sources of chlorine dioxide in a sufficient amount to induce an increase in carboxyl substitution in the carbohydrate of at least 2 meq/100 g.

4. A method of making a carboxylated carbohydrate product which comprises: oxidizing a carbohydrate compound by reacting the carbohydrate in an aqueous system with a sufficient amount of a primary oxidant selected from the group consisting of hindered heterocyclic oxammonium salts in which the carbon atoms adjacent the oxammonium nitrogen lack .alpha.-hydrogen substitution, the corresponding amines, hydroxylamines, and nitroxides of these oxammonium salts, and mixtures thereof, in which the nitroxide is 2,2,6,6-tetramethyl-4-benzyloxypiperidinyl-1-oxy free radical, and a secondary oxidant selected from chlorine dioxide and latent sources of chlorine dioxide in a sufficient amount to induce an increase in carboxyl substitution in the carbohydrate of at least 2 meq/100 g.

5. A method of making a carboxylated carbohydrate product which comprises: oxidizing a carbohydrate compound by reacting the carbohydrate in an aqueous system with a sufficient amount of a primary oxidant selected from the group consisting of hindered heterocyclic oxammonium salts in which the carbon atoms adjacent the oxammonium nitrogen lack .alpha.-hydrogen substitution, the corresponding amines, hydroxylamines, and nitroxides of these oxammonium salts, and mixtures thereof, in which the nitroxides are compositions having the structure

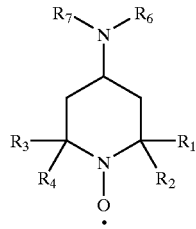

in which $R_1$–$R_4$ are one to four carbon alkyl groups but $R_1$ with $R_2$ and $R_3$ with $R_1$ may together be included in a five or six carbon alicyclic ring structure, and $R_6$ is hydrogen or $C_1$–$C_5$ alkyl, and $R_7$ is hydrogen, $C_1$–$C_5$ alkyl, phenyl, carbamoyl, alkyl carbamoyl, phenyl carbamoyl, or $C_1$–$C_8$ acyl, and a secondary oxidant selected from chlorine dioxide and latent sources of chlorine dioxide in a sufficient amount to induce an increase in carboxyl substitution in the carbohydrate of at least 2 meq/100 g.

6. The method of claim 5 in which the nitroxide is 2,2,6,6-tetramethyl-4-aminopiperidinyl-1-oxy free radical.

7. The method of claim 5 in which the nitroxide is 2,2,6,6-tetramethyl-4-acetylaminopiperidinyl-1-oxy free radical.

8. A method of making a carboxylated carbohydrate product which comprises: oxidizing a carbohydrate compound by reacting the carbohydrate in an aqueous system with a sufficient amount of a primary oxidant selected from the group consisting of hindered heterocyclic oxammonium salts in which the carbon atoms adjacent the oxammonium nitrogen lack .alpha.-hydrogen substitution, the corresponding amines, hydroxylamines, and nitroxides of these oxammonium salts, and mixtures thereof, in which the nitroxides are compositions having the structure

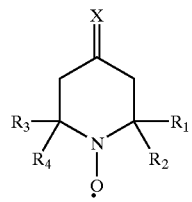

in which $R_1$–$R_4$ are one to four carbon alkyl groups but $R_1$ with $R_2$ and $R_3$ with $R_4$ may together be included in a five or six carbon alicyclic ring structure, and X is oxygen, sulfur, NH, N-alkyl, NOH, or $NOR_8$ where $R_8$ is lower alkyl, and a secondary oxidant selected from chlorine dioxide and latent sources of chlorine dioxide in a sufficient amount to induce an increase in carboxyl substitution in the carbohydrate of at least 2 meq/100 g.

9. The method of claim 8 in which the nitroxide is 2,2,6,6-tetramethyl-4-piperidone-1-oxy free radical.

10. A method of making a carboxylated carbohydrate product which comprises: oxidizing a carbohydrate compound by reacting the carbohydrate in an aqueous system with a sufficient amount of a primary oxidant selected from the group consisting of hindered heterocyclic oxammonium salts in which the carbon atoms adjacent the oxammonium nitrogen lack .alpha.-hydrogen substitution, the corresponding amines, hydroxylamines, and nitroxides of these oxammonium salts, and mixtures thereof, in which the nitroxides are compositions having the structure

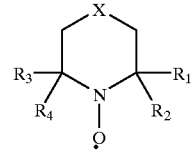

wherein $R_1$–$R_1$ are one to four carbon alkyl groups but $R_1$ with $R_2$ and $R_3$ with $R_4$ may be linked into a five or six carbon alicyclic ring structure, X is oxygen, sulfur, -alkyl amino, or acyl amino, and a secondary oxidant selected from chlorine dioxide and latent sources of chlorine dioxide in a sufficient amount to induce an increase in carboxyl substitution in the carbohydrate of at least 2 meq/100 g.

11. The method of claim 10 in which the nitroxide is 3,3,5,5-tetramethylmorpholine-1-oxy free radical.

12. A method of making a carboxylated carbohydrate product which comprises: oxidizing a carbohydrate compound by reacting the carbohydrate in an aqueous system with a sufficient amount of a primary oxidant selected from the group consisting of hindered heterocyclic oxammonium salts in which the carbon atoms adjacent the oxammonium nitrogen lack .alpha.-hydrogen substitution, the corresponding amines, hydroxylamines, and nitroxides of these oxammonium salts, and mixtures thereof, in which the nitroxides are compositions having the structure

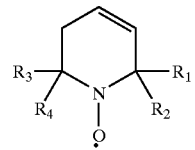

wherein $R_1$–$R_4$ are one to four carbon alkyl groups but $R_1$ with $R_2$ and $R_3$ with $R_4$ may be linked into a five or six carbon alicyclic ring structure, and a secondary oxidant selected from chlorine dioxide and latent sources of chlorine dioxide in a sufficient amount to induce an increase in carboxyl substitution in the carbohydrate of at least 2 meq/100 g.

13. The method of claim 12 in which the nitroxide is 3,4-dehydro-2,2,6,6,-tetramethylpiperidinyl-1-oxy free radical.

14. A method of making a carboxylated carbohydrate product which comprises: oxidizing a carbohydrate compound by reacting the carbohydrate in an aqueous system with a sufficient amount of a primary oxidant selected from the group consisting of hindered heterocyclic oxammonium salts in which the carbon atoms adjacent the oxammonium nitrogen lack .alpha.-hydrogen substitution, the corresponding amines, hydroxylamines, and nitroxides of these oxammonium salts, and mixtures thereof, in which the nitroxides are compositions having the structure

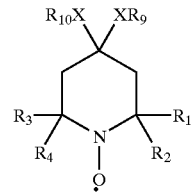

wherein $R_1$–$R_4$ are one to four carbon alkyl groups but $R_1$ with $R_2$ and $R_3$ with $R_4$ may together be included in a five or six carbon alicyclic ring structure, X is methylene, oxygen, sulfur, or alkylamino, and $R_9$ and $R_{10}$ are one to five carbon alkyl groups and may together be included in a five or six member ring structure which, in turn, may have one to four lower alkyl or hydroxy alkyl substituents, and a secondary oxidant selected from chlorine dioxide and latent sources of chlorine dioxide in a sufficient amount to induce an increase in carboxyl substitution in the carbohydrate of at least 2 meq/100 g.

15. The method of claim 14 in which each X is oxygen, the oxygen atoms being linked by a two to three carbon alkyl chain to form a cyclic ketal substituent.

16. The method of claim 15 in which the nitroxide composition is the 1,2-ethanediol cyclic ketal of 2,2,6,6-tetramethyl-4-piperidone-1-oxy free radical.

17. The method of claim 15 in which the nitroxide composition is the 1,3-propanediol cyclic ketal of 2,2,6,6-tetramethyl-4-piperidone-1-oxy free radical.

18. The method of claim 15 in which the nitroxide composition is the 2,2-dimethyl-1,3-propanediol cyclic ketal of 2,2,6,6-tetramethyl-4-piperidone-1-oxy free radical.

19. The method of claim 15 in which the nitroxide is the glyceryl cyclic ketal of 2,2,6,6-tetramethyl-4-piperidone-1-oxy free radical.

20. A method of making a carboxylated carbohydrate product which comprises: oxidizing a carbohydrate compound by reacting the carbohydrate in an aqueous system with a sufficient amount of a primary oxidant selected from the group consisting cof hindered heterocyclic oxammonium salts in which the carbon atoms adjacent the oxammonium nitrogen lack .alpha.-hydrogen substitution, the corresponding amines, hydroxylamines, and nitroxides of these oxammonium salts, and mixtures thereof, in which the nitroxides have a five atom ring structure with 2,2,5,5 lower alkyl substitution, and a secondary oxidant selected from chlorine dioxide and latent sources of chlorine dioxide in a sufficient amount to induce an increase in carboxyl substitution in the carbohydrate of at least 2 meq/100 g.

21. The method of claim 20 in which the nitroxides are compositions having the structure

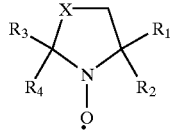

in which $R_1$–$R_4$ are one to four carbon alkyl groups but $R_1$ with $R_2$ and $R_3$ with $R_4$ may together be included in a five or six carbon alicyclic ring structure, and X may be methylene, sulfur, oxygen, —NH, or $NR_{11}$, in which $R_{11}$ is a lower alkyl.

22. The method of claim 21 in which the nitroxide composition is 2,2,5,5-tetramethylpyrrolidinyl-1-oxy free radical.

23. A method of making a carboxylated carbohydrate product which comprises: oxidizing a carbohydrate compound by reacting the carbohydrate in an aqueous system with a sufficient amount of a primary oxidant selected from the group consisting of hindered cyclic nitroxides having the composition

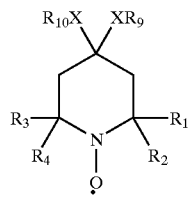

wherein $R_1$–$R_4$ are one to four carbon alkyl groups but $R_1$ with $R_2$ and $R_3$ with $R_4$ may together be included in a five or six carbon alicyclic ring structure, X is methylene, oxygen, sulfur, or alkylamino, and $R_9$ and $R_{10}$ are one to five carbon alkyl groups and may together be included in a five or six member ring structure which, in turn, may have one to four lower alkyl or hydroxy alkyl substituents; and a secondary oxidant selected from chlorine dioxide and latent sources of chlorine dioxide in a sufficient amount to induce an increase in carboxyl substitution in the carbohydrate of at least 2 meq/100 g.

24. The method of claim 23 in which each X is oxygen, the oxygen atoms being linked by a two to three carbon alkyl chair to form a cyclic ketal substituent.

25. The method of claim 24 in which the nitroxide is the glyceryl cyclic ketal of 2,2,6,6-tetramethyl-4-piperidone-1-oxy free radical.

26. The method of claim 24 in which the cyclic ketal is selected from the group consisting of the 1,2-ethanediol, 1,3-propanediol, 2,2-dimethyl-1,3-propanediol, and glyceryl ketals of 2,2,6,6-tetramethyl-4-piperidone-1-oxy free radicals and mixtures thereof.

27. The method of claim 26 in which the nitroxide composition is the 1,2-ethanediol cyclic ketal of 2,2,6,6-tetramethyl-4-piperidone-1-oxy free radical.

28. The method of claim 26 in which the nitroxide composition is the 1,3-propanediol cyclic ketal of 2,2,6,6-tetramethyl-4-piperidone-1-oxy free radical.

29. The method of claim 26 in which the nitroxide composition is the 2,2-dimethyl-1,3-propanediol cyclic ketal of 2,2,6,6-tetramethyl-4-piperidone-1-oxy free radical.

30. The method of claim 23 in which the carbohydrate is a polymeric compound and which further comprises protecting the carbohydrate against degree of polymerization (D.P.) loss by further treating it in aqueous suspension with a stabilizing agent selected from the group consisting of oxidizing agents and reducing agents in order to remove any substituents which tend to cause molecular chain breakage.

31. The method of claim 30 in which the carbohydrate compound is cellulose.

32. The method of claim 31 in which the cellulose is fibrous and is selected from the group consisting of bleached and unbleached kraft wood pulps, prehydrolyzed kraft wood pulps, sulfite wood pups and mixtures thereof.

33. The method of claim 32 in which the cellulose fiber is recycled secondary fiber.

34. The method of claim 31 which further comprises treating the carboxylated cellulose fibers with a tertiary oxidizing agent to stabilize the product by substantially converting any aldehyde substituents to additional carboxyl groups.

35. The method of claim 34 in which the tertiary oxidant is selected from the group consisting of alkali metal chlorites, a chlorine dioxide/hydrogen peroxide mixture, and peracids.

36. The method of claim 35 in which the tertiary oxidant is a mixture of chlorine dioxide and hydrogen peroxide.

37. The method of claim 35 in which the tertiary oxidant is sodium chlorite.

* * * * *